United States Patent [19]

Wisner et al.

[11] 4,271,355

[45] Jun. 2, 1981

[54] METHOD FOR MITIGATING 2πN AMBIGUITY IN AN ADAPTIVE OPTICS CONTROL SYSTEM

[75] Inventors: George R. Wisner, Deep River; Robert M. Elkow, Manchester, both of Conn.

[73] Assignee: United Technologies Corporation, Hartford, Conn.

[21] Appl. No.: 71,510

[22] Filed: Aug. 30, 1979

[51] Int. Cl.³ .................................................. G01J 1/20

[52] U.S. Cl. ...................................... 250/201; 250/205

[58] Field of Search ............... 250/201, 204, 205, 215, 250/216, 237 G, 578; 350/160 R, 162 R, 162 SF; 331/94.5 R, 94.5 C, 94.5 Q, 94.5 ML

[56] References Cited

U.S. PATENT DOCUMENTS

| | | | |
|---|---|---|---|
| 3,979,585 | 9/1976 | O'Meara | 350/160 R |
| 3,988,608 | 10/1976 | O'Meara | 250/201 |

*Primary Examiner*—David C. Nelms
*Attorney, Agent, or Firm*—Lawrence A. Cavanaugh

[57] ABSTRACT

A method of mitigating 2πN phase ambiguity in an adaptive optics control system is disclosed wherein the radiation sensed by a detector within a feedback loop is passed through an aperture having a variable diameter. The turn-on of the adaptive optics control system is initiated with the aperture in an open position to transmit radiation from all actuator zones onto the detector resulting in a convergence free of the 2πN phase ambiguity. The diameter of the aperture is then reduced slowly compared to the bandwidth of the control system to converge to a near diffraction limited output beam at the aperture.

4 Claims, 3 Drawing Figures

LASER
SERVO
CONTROL
SYSTEM
TO REMOTE
TARGET

LASER
SERVO
CONTROL
SYSTEM
TO
REMOTE
TARGET
FROM REMOTE TARGET

PREAMPLIFIER
TO BANDPASS FILTERS FOR OTHER CHANNEL PAIRS
BANDPASS FILTER
IN PHASE SYNCHRONOUS DETECTOR
QUADRATURE SYNCHRONOUS DETECTOR
LOW PASS FILTER
INTEGRATOR
INTEGRATOR
DRIVE AMPLIFIER
DRIVE AMPLIFIER
90 DEG. PHASE SHIFTER
DITHER DRIVE AMPLIFIER
DITHER GEN.
APERTURE CONTROL LOGIC
42
58
60
60
62
62
64
66
66
68
70
70
72
72
74
74
76
78
80
44
46
46
52
52
58

METHOD FOR MITIGATING $2\pi N$ AMBIGUITY IN AN ADAPTIVE OPTICS CONTROL SYSTEM

The Government has rights in this invention pursuant to Contract No. N60921-77-C-0008 awarded by the Department of the Navy.

BACKGROUND OF THE INVENTION

The present invention relates to adaptive optics, and more particularly, to a hill-climbing adaptive optics system having a variable aperture for mitigating $2\pi N$ ambiguity in the control system signals.

The intensity of radiation incident onto a remote target is often compromised by irregularities inherent in the phase distribution of the wavefront of the beam of radiation transmitted to the target. Ideally, the radiation incident onto a remote target should have a waterfront distribution which is near diffraction limited for many applications. However, distortions of the wavefront distributions can result from inhomogenuities within the gain medium of the laser, atmospheric turbulence and thermal blooming along the path of the radiation transmitted to the target, mechanical vibrations and thermally induced distortions of the optical components defining the laser system and by other means well known in the art. To insure a near diffraction limited beam incident onto a remote target, a dynamic active feedback control system is required for providing phase-induced corrections to the wavefront distribution of the beam to compensate the aforesaid distortions. Such feedback control systems are well known in the art.

Angelbeck et al in U.S. Pat. No. 4,091,274 discloses an active laser mirror system for achieving near diffraction limited transmission of laser radiation by actively controlling a reflective surface in the system to induce phase corrections within the beam for compensating phase distortions introduced by inhomogenuities within the path of the transmitted beam. The system incorporates a feedback loop including actuators disposed on a mirror for inducing phase corrections into the radiation wavefront. O'Meara in U.S. Pat. No. 3,731,103 discloses a laser system wherein adaptive phase control is used to establish an in-phase condition for a transmitted beam at a remotely located target. A plurality of subaperture areas of the transmitted beam are phase modulated at distinct modulation frequencies. Amplitude fluctuations in a received beam, at the modulation frequencies, are indicative of phase distortions, from the diffraction limited distribution, in the transmitted beam. The phase control system adjusts the relative phase of the subaperture areas of the transmitted beam to minimize the amplitude fluctuations in the received beam to establish an in-phase condition of the wavefront distribution of the transmitted beam on the target. See also U.S. Pat. Nos. 3,727,223 and 3,764,213.

Freiberg in copending U.S. patent application Ser. No. 911,259, which is held by a common assignee with the present application, discloses a resonator feedback system wherein the wavefront distribution of the output beam of a laser is controlled by adaptive optic elements within the cavity defining the laser resonator. A servo control system provides multi-correction signals to the adaptive optic elements to induce phase corrections to the radiation within the resonator to provide a near diffraction limited output beam.

Common to most prior art adaptive optics systems is the requirement that the system wavefront error be brought to within $\pm 2\pi$ radians of reference before the initial turn-on of a multidither controller to drive the system to a high quality null. In a local loop multidither adaptive optics system, the requirement for pre-alignment to eliminate the $2\pi$ ambiguities necessitates the use of a figure sensor to measure the optical surface figure of the corrector mirror. This added sensor substantially increases the cost and complexity of the adaptive optics system. In a typical adaptive optics system, the $2\pi N$ ambiguity results from the utilization of a diaphragm having a small aperture, typically with a diameter approximating one-tenth the diameter of the Airy disk, at the Fourier transform plane of a focusing mirror within the feedback loop that permits only a small portion of the focused radiation to enter a detector. When sections of the wavefront distribution differ by $2\pi N$ in optical phase, local non-global maxima occur in the aperture and the control system converges on these non-global local maxima rather than on the global maxima resulting in a $2\pi N$ in ambiguity in the convergence. Thus, in essentially all of the prior art systems utilizing continuous surface deformable mirrors as the wavefront correction element, correctable phase error has to be reduced to less than $2\pi$ before the control loop is activated to insure convergence at a global maxima.

SUMMARY OF THE INVENTION

A primary object of the present invention is the mitigation of $2\pi N$ phase ambiguity in a multidither adaptive optics system.

In accordance with the present invention, $2\pi N$ phase ambiguity in an adaptive optics control system is mitigated by utilizing a variable aperture field stop in a Fourier transform plane of focusing optics within a servo control loop. The control system is initiated with the aperture in an open position for passing therethrough a significant portion of the focused radiation. The aperture is maintained in the open position until the control system maximizes the intensity distribution incident onto a detector with the system converging to a drifting set point. The diameter of the aperture is then reduced slowly compared to the bandwidth of the control system while maintaining a global maximum of the focused radiation within the aperture to obtain a stable set point of the servo control system thereby producing a high quality null.

A primary feature of the present invention is the utilization of a field stop having a variable aperture. The control system is turned on with the aperture open to a diameter large enough to provide control signals from all the actuation zones and much larger than the first Airy zero of the focused radiation passing therethrough to the detector. The control system maximizes the radiation passing through the aperture, but converges with finite drift about the global maxima. After the radiation intensity is maximized, the diameter of the aperture is reduced in a time period slow compared to the bandwidth of the control system to converge the system to a stable set point with reduced drift. The maximum diameter of the aperture is limited only by the requirement of having sufficient signal-to-noise ratio of the dither signals superimposed on the focused radiation to obtain convergence.

A primary advantage of the present invention is the mitigation of $2\pi N$ phase ambiguity in an adaptive optics control system. Additionally, the requirement for the utilization of a figure sensor or the like to measure the optical surface contour of the corrector mirror to within $\pm 2\pi$ of reference phase before turn-on of the control system is eliminated.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
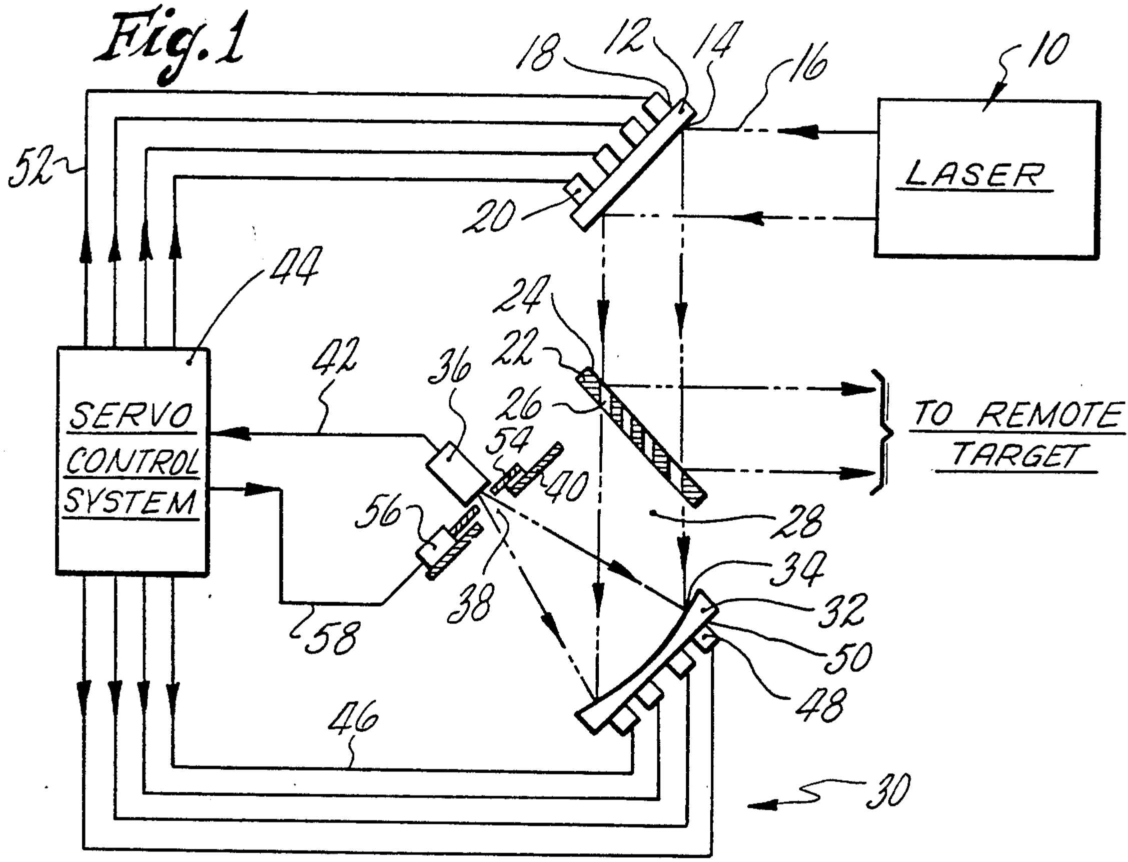
FIG. 1 is a simplified schematic of the principal components of the present invention.

Referring now to FIG. 1 wherein a simplified schematic of an adaptive optics system for providing a near diffraction limited output beam to a remote target is shown. The optical system includes a laser 10, a control mirror 12 having a reflective surface 14 on one side disposed on the optical path 16 of an output beam from the laser and a back surface 18 with a plurality of phase control actuators 20 disposed thereon, a beam sampler 22 having a reflective surface 24 adapted for directing a majority of the output beam to a remote extended target (not shown) and for passing a minor portion of the output beam through a multiplicity of apertures 26 to form a monitor beam 28. The system further includes a feedback loop 30 with a dither mirror 32 having a concave reflecting surface 34 in optical communication with the monitor beam 28 for focusing the monitor beam to a detector 36 through an aperture 38 within a field stop 40 for providing an electrical input signal 42 to a servo system 44. The servo system provides multidither signals 46 to the plurality of dither transducers 48 attached to the back surface 50 of the dither mirror and synchronously monitors the electrical input signal 42 with the multidither signals 46 to provide multi-correctional signals 52 to the plurality of phase control actuators 20 disposed on the back surface 18 of the corrector mirror 12. The field stop 40 includes a variable iris 54 or other means well known in the art for varying the diameter of the aperture 38. In the preferred embodiment the diameter of the iris is varied by motor means 56 responsive to an aperture control signal 58 from the servo system.

Figure 2:
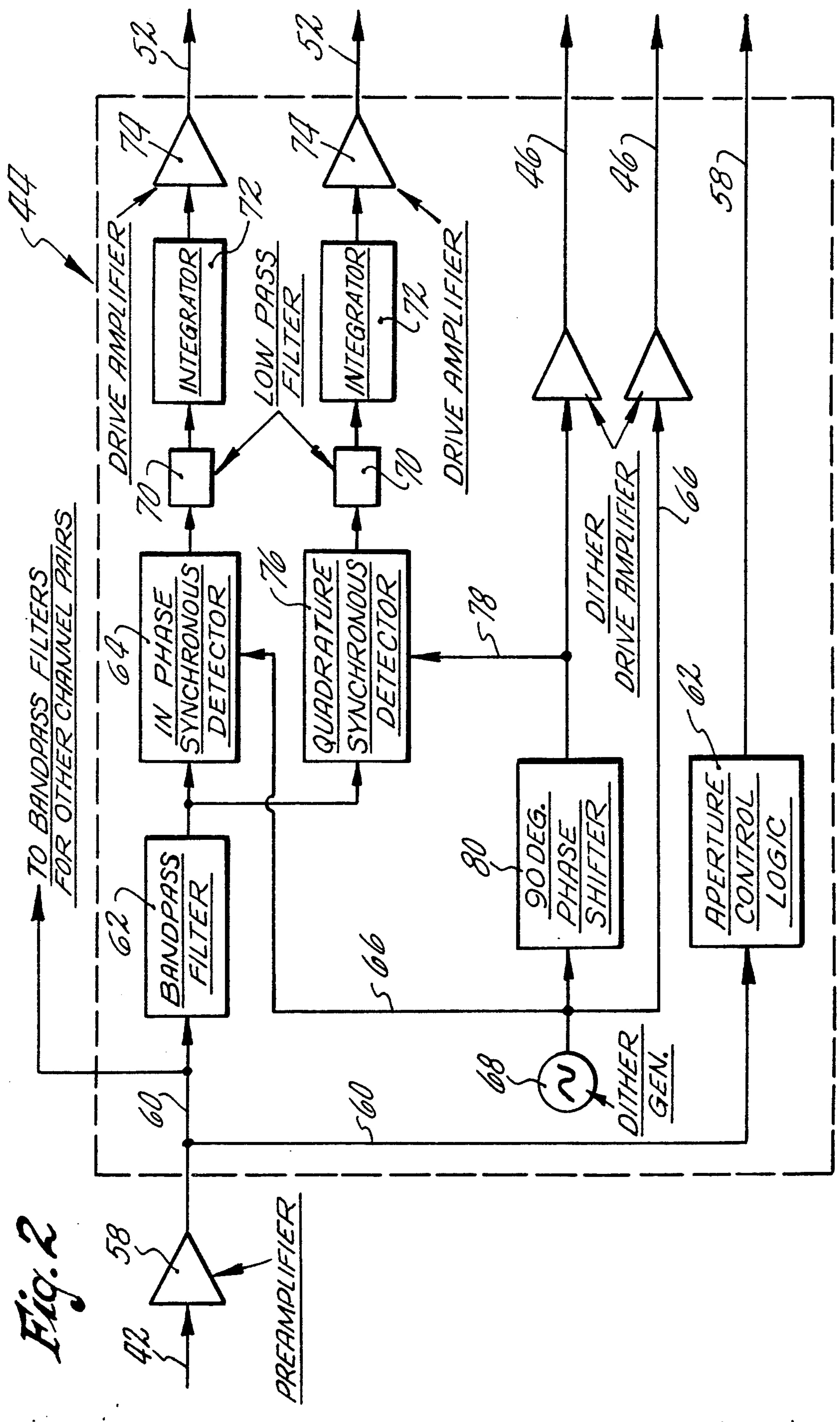
FIG. 2 is a simplified schematic of the servo system shown in FIG. 1.

Referring now to FIG. 2 wherein the servo system 44 is shown in greater detail. The servo system includes a preamplifier 58 for amplifying the electrical input signal 42 to provide signals 60 to aperture control logic 62 for energizing the motor means 56 controlling the diameter of the iris 54 as shown in FIG. 1 and to band-pass filters 62 for each pair of phase control actuators. A portion of the output from each band-pass filter is passed to an in-phase synchronous detector 14 and processed with a dither signal 66 from a dither generator 68 by hill-climbing circuitry (not shown) to provide an in-phase signal which is passed through a low pass filter 70 to eliminate the dither signal, and through an integrator 72 and correction drive amplifier 74 to provide a correction signal 52 to a phase control actuator. The remaining portion of the output from the band-pass filter is passed to quadrature synchronous detector 76 and processed with a dither signal 78 which has been frequency shifted ninety degrees by shifter 80 to provide a quadrature phase signal which is passed through a low pass filter 70, through an integrator 72 and correction drive amplifier 74 to provide a correction signal 52 to a phase control actuator. The dither signals 66, 78 are also passed through dither drive amplifiers to provide dither signals 46 to the dither actuators. The dither actuators and the phase control actuators are in register with one another.

In operation, an output beam from the laser 10 is directed along the optical path 16 to the control mirror 12 which reflects the radiation to the beam sampler 22 wherein a major portion of the beam is directed to a remote target while a minor portion of the beam is passed through the plurality of apertures 26 to form the monitor beam 28. The monitor beam is focused by the dither mirror 32 through the aperture 38 onto the detector 36 positioned behind the field stop juxtaposed the aperture. Temporally varying phase perturbations within the laser or within the optical path to the detector result in phase variation in the near field of the output beam. In the embodiment of the present invention as shown in FIG. 1, the near field distribution of the monitor beam is Fourier transformed at the focal plane of the dither mirror into the far field distribution to provide at the detector amplitude fluctuation in the intensity corresponding to phase variations in the output beam. The detector 36 senses the fluctuating amplitude variations and generates the electrical input signal 42 which is directed to the servo system 44.

The servo system as shown in FIG. 2 includes circuitry well known in the art for providing multidither signals to the plurality of dither transducers 48 attached to the back surface of the dither mirror. Sinusoidal dither signals are provided typically at frequency between five to thirty kilohertz, to each of the dither transducers to deform that portion of the dither mirror to which the transducer is attached to impress sinusoidal phase modulation, typically corresponding to approximately one-tenth of a wavelength, onto the monitor beam. Preferably, each of the dither signals is provided at a discrete frequency which does not contain harmonics of the other dither signals to provide spatial phase modulation of the monitor beam at several discrete dither frequencies. The spatial format for the multidither phase modulation of the monitor beam preferably consists of the displacement of discrete mirror zones within the dither mirror but it is to be recognized that continuous mirror zones or modes may also be utilized. In the preferred embodiment, the dither transducers are piezoelectric transducers.

The electrical input signal 42 generated by the detector 36 is synchronously monitored in the servo system at each of the dither frequencies with appropriate hill-climbing circuitry well known in the art to produce direct current multi-correction signals 52 having amplitude and phase information, at each frequency for which the dither signal and the electrical input signal has a coincidence, proportional to the amount and radial position of the phase perturbation within the output beam. The multi-correction signals activate phase control transducers 20 attached to the back surface of the corrector mirror 12 which appropriately modify the reflective surface 14 of the control mirror to induce phase changes in the wavefront distribution of the output beam to compensate for the temporally varying phase perturbations generated in the output beam as hereinbefore noted to provide a substantially diffraction limited output beam to a remote target. The diffraction effect of the radiation passing through the aperture results in global and local radiation intensities incident onto the detector. Prior art adaptive optics systems typically utilized apertures having a fixed diameter of approximately one-tenth diameter of the first Airy zero of the diffraction pattern. The small diameter allowed only a small portion of the diffracted radiation to be incident onto the detector. When sections of the output beam differ by $2\pi N$ in optical phase, local interference maxima occurs within the aperture and the servo control system maximizes on a local maximum rather than on the global maximum with a resulting $2\pi N$ ambiguity in the adaptive optics control system's set point.

In accordance with the present invention the field stop 40 includes a variable iris diaphragm 54 capable of varying the diameter of the aperture 38 from a fraction of the first Airy zero of the focused radiation passing therethrough to several tens of diameters of the first Airy zero. In operation the adaptive optics control system is initially turned on with the iris diaphragm in an open position to provide an aperture having a diameter large enough to provide control signals from all the actuation zones and much larger than the first Airy disk. The aperture 38 is sized to have a diameter sufficient to allow the central lobe or global maximum plus several side lobes of the focused radiation be transmitted while maintaining the signal-to-noise ratios of the dither signals impressed on the focused beam sufficiently large to enable the control system to converge on a radiation intensity maximum incident on the detector. Operating the system with the aperture in an open position mitigates the $2\pi N$ phase ambiguity of the control system by converging the diffraction pattern which is transmitted to the detector. However, the signal-to-noise ratio of the multi-correction signals is low, resulting in part from converging the diffraction pattern incident on the detector with the result that the servo system is unable to establish a stable set point. After the adaptive optics control system has been turned on with the aperture in the open condition, the diameter of the aperture is reduced slowly compared to the bandwidth of the control system to increase the signal-to-noise ratio of the dither signal incident on the detector to enable the control system to reach a more refined converged state. The reduced diameter aperture improves the signal-to-noise ratio of the dither signals and allows the control system to converge to a stable set point to provide a high quality null of the multi-correctional signals. During the operation of the control system, the multi-correction signals activate the phase control transducers on the control mirror to modify the contour thereof to produce phase corrections to the beam until the amplitude of each of the multi-correction signals approach zero which establishes the set point of the control system. When the amplitude of all the correction signals is zero, the output beam has a far field distribution which is near diffraction limited.

Operation of the control system in accordance with the present invention causes the global maxima to be incident onto the detector to mitigate $2\pi N$ phase ambiguity and synchronously reducing the diameter of the aperture while the control system is converging to a null allows the multi-correction signals to correctly move the actuators to provide phase correction to the radiation to obtain convergence with a global maxima incident onto the detector. It is to be recognized that the higher the order of the phase ambiguity, the larger the diameter of the aperture requirement to capture the global maxima.

As shown in FIG. 1, phase control actuators are attached to a corrector mirror located outside the laser. It is to be recognized that the phase control actuators may be located on the back surface of one of the mirrors defining the optical cavity of the laser 10, as disclosed by Freiberg in U.S. patent application, having Ser. No. 911,259 as hereinbefore noted.

Figure 3:
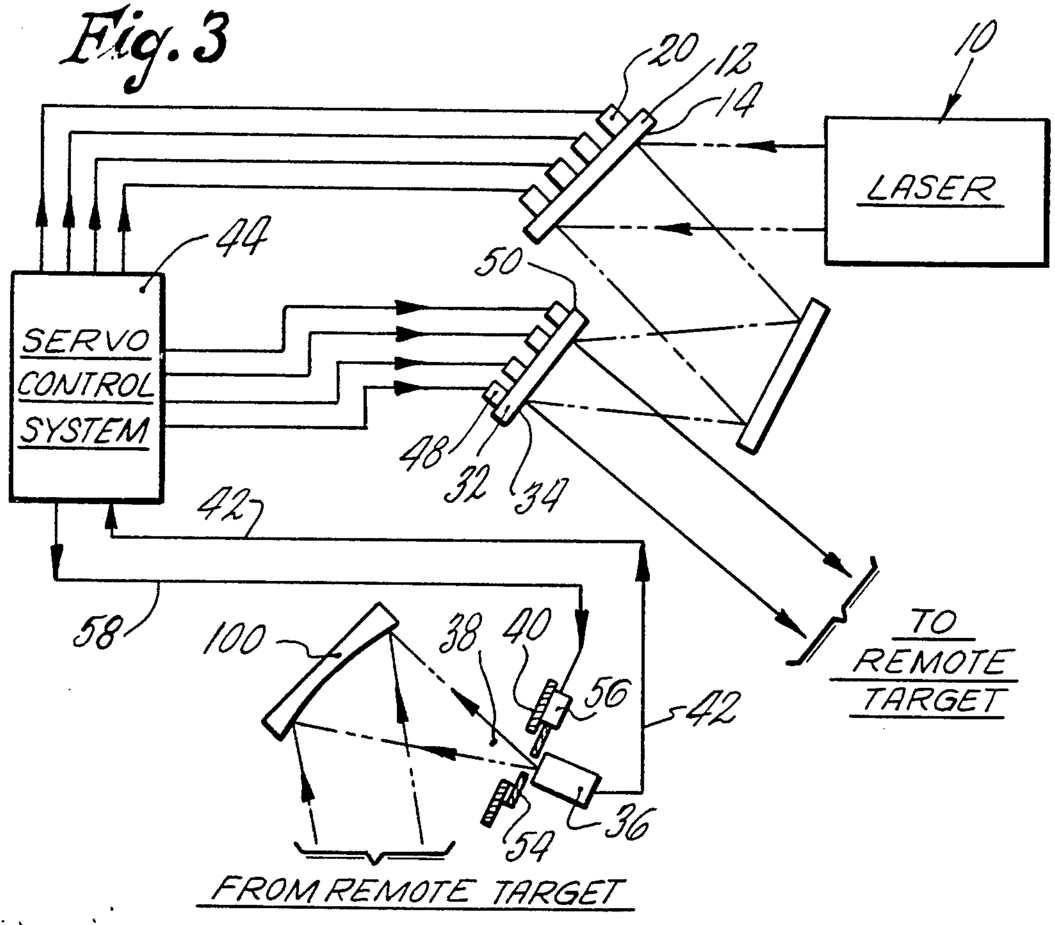
FIG. 3 is a simplified schematic of an embodiment of the invention as shown in FIG. 1.

It is to be recognized that the invention as shown in FIG. 1 may be utilized in an optical system in which the dither signal is impressed on the output beam transmitted to a remote extended target as shown in FIG. 3 wherein like elements have like numerals. The dither mirror 32 includes actuators 48 disposed on the back surface 50 adapted for impressing a dither signal on the transmitted beam. Radiation reflected from an extended target is collected by collector 100 and focused through the variable aperture to the detector. The operation of the adaptive optics control system is as hereinbefore described. It is to be recognized that the corrector mirror may be located within or without the laser 10.

Although this invention has been shown and described with respect to a preferred embodiment thereof, it should be understood by those skilled in the art that various changes and omissions in the form and detail thereof may be made witout departing from the spirit and scope of the invention.

Having thus described a typical embodiment of our invention, that which we claim as new and desire to secure by Letters Patent of the United States is:

1. An improved adaptive optics control system of the type in which phase distortions in a beam of radiation are corrected by impressing dither signals on at least a portion of the beam with dither actuators attached to a dither mirror and the dither beam is focused with focusing optics through an aperture to a detector to provide electrical input signals which are synchronously processed in a servo system with electrical signals provided to the dither actuators to provide electrical correction signals to corrector actuators on a phase correction mirror to provide phase corrections to the beam of radiation wherein the improvement comprises:

a field stop having an aperture with a variable diameter disposed between the detector and the focusing optics substantially at the Fourier transform plane of the focusing optics; and means for varying the diameter of the aperture slowly compared to the bandwidth of the control system.

2. In a method of mitigating $2\pi N$ phase ambiguity in an adaptive optics control system of the type in which phase distortion in a beam of radiation is corrected by impressing dither signals on at least a portion of the beam with dither actuators attached to a dither mirror and the dithered beam is focused with focusing optics through an aperture in a detector to provide electrical input signals which are synchronously processed in a servo system with electrical signals provided to the dither actuators to provide electrical correction signals to corrector actuators on a phase correction mirror to provide phase corrections to the beam of radiation, the improvement characterized by:

providing a field stop with an aperture having a variable diameter disposed between the detector and the focusing optics substantially at the Fourier transform plane of the focusing optics;

initiating the turn-on of the control system with the aperture in a first open position to enable substantially all of the focused radiation to pass therethrough to the detector to mitigate $2\pi N$ phase ambiguity of the servo system by converging the diffraction pattern of the radiation transmitted therethrough to the detector; and reducing the diameter of the aperture to a second open position slowly compared to the bandwidth of the control system to increase the signal-to-noise ratio of the dither signal incident onto the detector to enable the control system to reach a more refined converged set point to obtain an output beam which is substantially diffraction limited.

3. The invention in accordance with claim 2 wherein the diameter of the aperture in the first open position is sufficiently large to pass radiation therethrough from substantially all of the areas of the corrector mirror illuminated by the beam of radiation while maintaining a signal-to-noise ratio of the dither signals impressed on the beam sufficient to converge the control system.

4. The invention in accordance with claim 2 wherein the diameter of the second open position is at least equal to one-tenth of the diameter of the first Airy zero of the focused radiation passing therethrough.

* * * * *